United States Patent
Wang et al.

(10) Patent No.: US 12,001,423 B2
(45) Date of Patent: Jun. 4, 2024

(54) METHOD AND ELECTRONIC DEVICE FOR OBTAINING HIERARCHICAL DATA STRUCTURE AND PROCESSING LOG ENTRIES

(71) Applicant: EMC IP Holding Company LLC, Hopkinton, MA (US)

(72) Inventors: Yudai Wang, Shanghai (CN); Min Liu, Shanghai (CN); Sanping Li, Beijing (CN); Travis Liu, Shanghai (CN); Yongbing Xue, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 17/389,268

(22) Filed: Jul. 29, 2021

(65) Prior Publication Data
US 2022/0300505 A1 Sep. 22, 2022

(30) Foreign Application Priority Data
Mar. 19, 2021 (CN) .......................... 202110296872.7

(51) Int. Cl.
*G06F 16/00* (2019.01)
*G06F 16/18* (2019.01)
*G06F 16/2452* (2019.01)

(52) U.S. Cl.
CPC .... *G06F 16/24522* (2019.01); *G06F 16/1805* (2019.01)

(58) Field of Classification Search
CPC ................ G06F 16/24522; G06F 16/1805
See application file for complete search history.

(56) References Cited

U.S. PATENT DOCUMENTS

| | | | | |
|---|---|---|---|---|
| 6,556,983 B1* | 4/2003 | Altschuler | ............ | G06F 16/907 707/E17.011 |
| 2015/0347923 A1* | 12/2015 | Bartley | ............... | G06F 11/0709 706/12 |
| 2016/0292592 A1* | 10/2016 | Patthak | ............... | G06F 16/2228 |
| 2017/0206235 A1* | 7/2017 | Karandikar | ......... | G06F 16/2358 |
| 2020/0356900 A1* | 11/2020 | Briancon | ............... | G06N 20/20 |

* cited by examiner

*Primary Examiner* — Tony Mahmoudi
*Assistant Examiner* — Suman Rajaputra
(74) *Attorney, Agent, or Firm* — Chamberlain, Hrdlicka, White, Williams, & Aughtry; Aly Z. Dossa

(57) ABSTRACT

A method, an electronic device, and a computer program product for obtaining a hierarchical data structure and processing a log entry is disclosed. The method for obtaining the hierarchical data structure includes: obtaining corresponding characteristic information included in each log entry of a set of log entries and determining multiple log entry patterns based on the corresponding characteristic information. The pattern characteristic information of each log entry pattern corresponds to the characteristic information of a subset of log entries in the set of log entries. The method also includes storing the set of log entries according to the hierarchical data structure so that each log entry is associated with at least one of multiple nodes of the hierarchical data structure. The multiple nodes respectively correspond to the multiple log entry patterns, and are hierarchically organized based on respective corresponding log entry patterns.

16 Claims, 7 Drawing Sheets

| Dimension | Threshold (score) | Level |
|---|---|---|
| Analyzability | 18 | Mature |
| | ≥ 9 | General |
| | < 9 | Immature |
| Maintainability | 9 | Mature |
| | ≥ 5 | General |
| | < 5 | Immature |
| Security | 6 | Mature |
| | ≥ 3 | General |
| | < 3 | Immature |
| Supportability | 24 | Mature |
| | ≥ 12 | General |
| | < 12 | Immature |

720

| Dimension | Rules | Threshold (score) | Analysis confidence level |
|---|---|---|---|
| Speed | Is a response to the request fast enough during the log analysis process? | 20<br>≥ 10<br>< 10 | High<br>General<br>Low |
| Source | Can logs from a distributed system be analyzed?<br>Can application/service logs be analyzed? | 18<br>≥ 9<br>< 9 | High<br>General<br>Low |
| Search | Is it sufficient to support a simple search syntax?<br>Can it support a complex query request robustly?<br>Can it support a filter that gives time? | 20<br>≥ 10<br>< 10 | High<br>General<br>Low |
| Scalability | Can it support log growth?<br>Can it support a log burst?<br>Can it support cloud-scale logs?<br>Can it support terabytes of logs? | 16<br>≥ 8<br>< 8 | High<br>General<br>Low |
| Advanced analysis | Does it support contemporary logging?<br>Does it support monitoring of potential log sources?<br>Does it support alarming and reviewing of potential problems?<br>Does it support analysis of root causes?<br>Does it support a streamlined report or a dashboard report? | 26<br>≥ 13<br>< 13 | High<br>General<br>Low |

| Dimension | Threshold (total score) | Comprehensive level |
|---|---|---|
| Log maturity level | 57<br>≥ 30<br>< 30 | High<br>General<br>Low |
| Analysis confidence level | 100<br>≥ 60<br>< 60 | High<br>General<br>Low |

Fig. 7C

METHOD AND ELECTRONIC DEVICE FOR OBTAINING HIERARCHICAL DATA STRUCTURE AND PROCESSING LOG ENTRIES

CROSS REFERENCE TO RELATED APPLICATIONS

This application claims priority under 35 U.S.C. § 119 to Chinese Patent Application No. 202110296872.7, filed on Mar. 19, 2021. The contents of Chinese Patent Application No. 202110296872.7 is incorporated by reference in its entirety.

TECHNICAL FIELD

Embodiments of the present disclosure relate to the field of computers, and more particularly, to a method, an electronic device, and a computer program product for obtaining a hierarchical data structure and processing a log entry.

BACKGROUND

Network devices, systems, and service programs will generate event records during operations. These event records may be stored in log entries (for example, in a form of lines) to form a log file; each log entry may record descriptive information, such as date, time, user, and action, related to the operations. With the development of information technologies, massive amount of data may be generated at all times. However, conventional solutions for processing log files or log entries cannot efficiently analyze the log files or log entries and thus fail to obtain valuable information.

SUMMARY OF THE INVENTION

Embodiments of the present disclosure provide a solution for obtaining a hierarchical data structure and processing a log entry.

In one aspect of the present disclosure, a method for obtaining a hierarchical data structure used to store log entries is provided. The method includes obtaining corresponding characteristic information included in each log entry of a set of log entries; determining multiple log entry patterns based on the corresponding characteristic information. The pattern characteristic information of each log entry pattern corresponds to characteristic information of a subset of log entries in the set of log entries. The method also includes storing the set of log entries according to the hierarchical data structure so that each log entry is associated with at least one of multiple nodes of the hierarchical data structure. The multiple nodes respectively correspond to the multiple log entry patterns, and are hierarchically organized based on respective corresponding log entry patterns.

In another aspect of the present disclosure, a method for processing a log entry is provided that includes receiving a request for processing a target log entry and processing the target log entry based on a hierarchical data structure obtained by the methods in accordance with one or more embodiments disclosed herein.

In another aspect of the present disclosure, an electronic device is provided. The electronic device includes a processor, and a memory coupled to the processor and having instructions stored therein. The instructions, when executed by the processor, cause the electronic device to execute actions, and the actions include obtaining corresponding characteristic information included in each log entry of a set of log entries and determining multiple log entry patterns based on the corresponding characteristic information. The pattern characteristic information of each log entry pattern corresponds to characteristic information of a subset of log entries in the set of log entries. The actions also include storing the set of log entries according to the hierarchical data structure so that each log entry is associated with at least one of multiple nodes of the hierarchical data structure. The multiple nodes respectively correspond to the multiple log entry patterns, and are hierarchically organized based on respective corresponding log entry patterns.

In another aspect of the present disclosure, an electronic device is provided. The device includes a processor; and a memory coupled to the processor and having instructions stored therein. The instructions, when executed by the processor, cause the electronic device to execute actions, and the actions include receiving a request for processing a target log entry and processing the target log entry based on a hierarchical data structure obtained by the electronic device in accordance with one or more embodiments disclosed herein.

In another aspect of the present disclosure, a computer program product is provided. The computer program product is tangibly stored on a computer-readable medium and includes machine-executable instructions. The machine-executable instructions, when executed, cause a machine to perform steps of one or more embodiments disclosed herein.

The Summary of the Invention section is provided to introduce the selection of concepts in a simplified form, which will be further described in the Detailed Description below. The Summary of the Invention section is neither intended to identify key characteristics or main characteristics of the present disclosure, nor intended to limit the scope of the present disclosure.

BRIEF DESCRIPTION OF THE DRAWINGS

The above and other objectives, characteristics, and advantages of the present disclosure will become more apparent by describing the example embodiments of the present disclosure in more detail with reference to the accompanying drawings. In the example embodiments of the present disclosure, the same or similar reference numerals generally represent the same or similar parts. In the accompanying drawings.

FIG. 6 illustrates a schematic diagram of a process for determining a third pattern according to one or more embodiments of the present disclosure;

FIG. 7A to FIG. 7C respectively illustrate tables of rules for rating log processing according to one or more embodiments of the present disclosure.

DETAILED DESCRIPTION

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

As discussed above, the conventional solutions for processing log files or log entries cannot efficiently analyze the log files or log entries and thus fail to obtain valuable information. Therefore, for such solutions, it is difficult to analyze log information such as a relationship among the log entries, and it is even impossible to perform optimization, such as log data deduplication, workload prediction, failure cause analysis, and tracing, on a storage system, based on the obtained analysis result.

In order to address, at least in part, the above disadvantages, the embodiments of the present disclosure provide a solution supporting analysis on log data. In this solution, corresponding characteristic information can be extracted from each log entry (for example, a line of log in a log file, which may correspond to an event log), and multiple log entries can be clustered based on the characteristic information to generate a hierarchical data structure to store the multiple log entries, each node in the hierarchical data will be linked to a subset of log entries among the multiple log entries, and will correspond to a log entry pattern, and the log entry pattern may identify common characteristics of the log entries in the subset of log entries. The generated hierarchical data structure can be used to achieve efficient storage and retrieval of the log entries.

The solution can obtain the further support efficient processing of the log entries. The processing includes such as storage and retrieval, and additionally or alternatively include an analytical processing of content recorded in the log entries for obtaining various characteristic information to facilitate subsequent processing.

Figure 1:
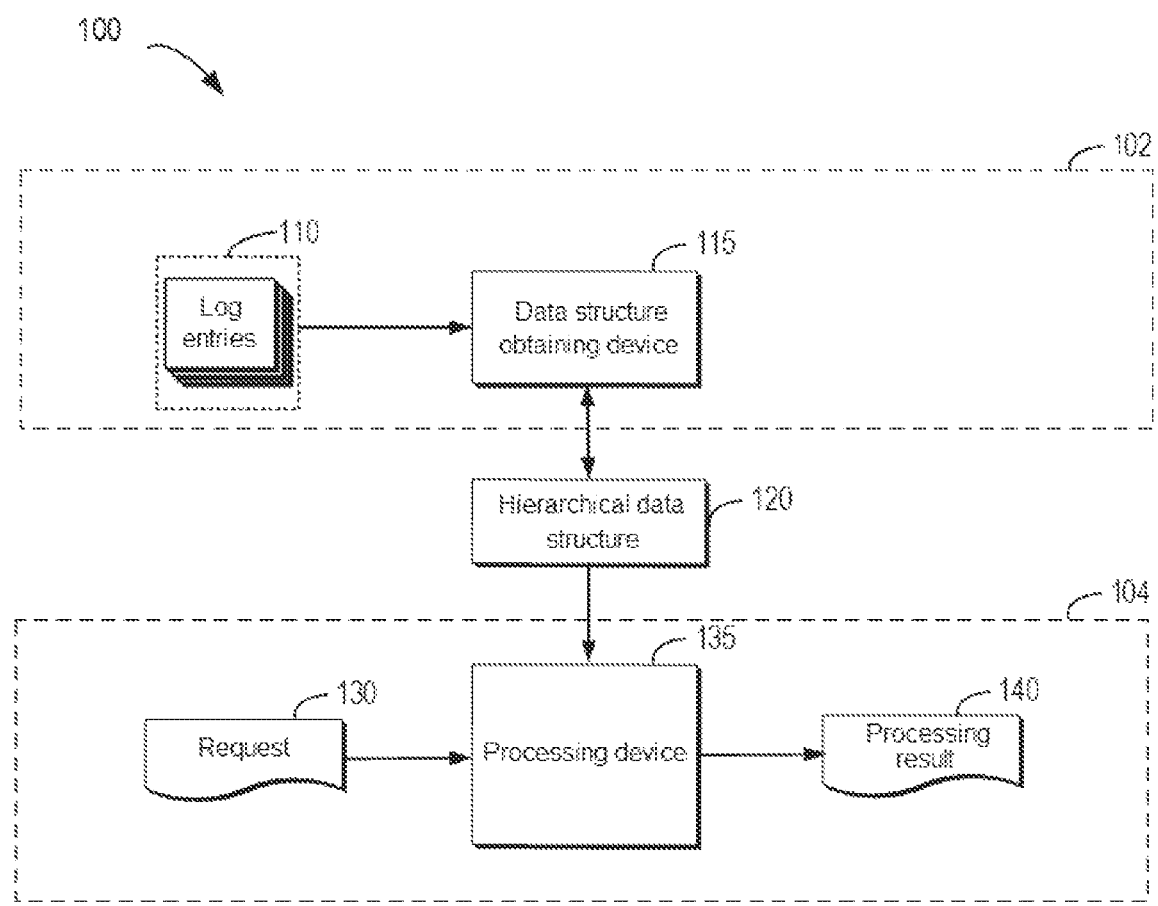
FIG. 1 is a schematic diagram of an example environment according to one or more embodiments of the present disclosure.

FIG. 1 is a schematic diagram of example environment 100 according to one or more embodiments of the present disclosure. In the example environment, a device and/or a method according to one or more embodiments of the present disclosure may be implemented. As shown in FIG. 1, the example environment may include hierarchical data structure obtaining subsystem 102 and log processing subsystem 104. Both hierarchical data structure obtaining subsystem 102 and log processing subsystem 104 can be implemented in different or the same computing device.

The computing device may be any device with a computing capability. As a non-limiting example, the computing device may be any type of non-mobile computing device, mobile computing device, or portable computing device, including but not limited to a desktop computer, a laptop computer, a notebook computer, a netbook computer, a tablet computer, a smart phone, and the like. All or part of the components of the computing device may be distributed in a cloud. The computing device may also adopt a cloud-edge architecture.

A storage device (not shown) includes storage disk(s) for storing data. The storage disk can be various types of devices with a storage function, including but not limited to a hard disk drive (HDD), a solid state disk (SSD), a removable disk, any other magnetic storage device, and any other optical storage device, or any combination thereof. The computing device (for example, data structure obtaining device 115 in hierarchical data structure obtaining subsystem 102) may be configured to store data such as a set of log entries 110 in an indexable manner (for example, according to hierarchical data structure 120) in the storage device.

The computing device (for example, processing device 135 in log processing subsystem 104) may also be configured to perform corresponding processing on the stored log data by means of hierarchical data structure 120 in response to request 130, to obtain corresponding processing result 140. In some embodiments, request 130 includes at least one of the following: a query request for log entries, a first analysis request for a log entry block composed of associated log entries, and a second analysis request for multiple associated log entry blocks. Processing result 140 correspondingly includes at least one of the following: the retrieved one or more log entries, an analysis result of the first analysis request (for example, first key information), and an analysis result of the second analysis request (for example, second key information).

In some embodiments, processing device 135 may use a natural language processing model (sometimes referred to as a model herein) to perform corresponding processing to obtain corresponding analysis results for responding to the analysis requests for the log entries. As described in the embodiments of the disclosure, the term "model" can learn a correlation between corresponding inputs and outputs from training data, so as to process a given input, based on a parameter set obtained by training and after the training is completed, to generate a corresponding output. The "model" can sometimes be referred to as "a neural network," "a learning model," "a learning network," or "a network." These terms are used interchangeably herein.

In some embodiments, processing device 135 may select a suitable initial model for training to obtain the model. The initial training model includes, but is not limited to, a support vector machine (SVM) model, a Bayesian model, a random forest model, and various deep learning/neural network models such as a convolutional neural network (CNN), a recurrent neural networks (RNN), a deep neural network (DNN), a deep Q-learning network (DQN), and the like.

In some embodiments, the model can be generated using various pre-trained neural network models. The pre-trained neural network models include, but are not limited to, a BERT (Bidirectional Encoder Representation from Transformers, a deep bidirectional language representation model based on converters), and the like. In some embodiments, the model may also refer to a joint model formed by combining different models. For example, the model may include a combination of at least one of the following modules: a tokenizer, a BERT module, a classifier based on a logistic regression algorithm, and/or a decision tree algorithm, and/or ensemble learning, or the like, a sequence labeling model module such as a conditional random field (CRF), and the like.

Environment 100 may further include a training data obtaining device and a model training device (not shown). In some embodiments, the above-mentioned multiple devices may be implemented in different or the same computing devices. For example, the training data obtaining device and the model training device may be implemented in the same computing device, which is different from the computing device in which processing device 135 is implemented.

In a model training stage, the training data obtaining device can obtain input data and provide it to the model. The input data may be one of a training set, a validation set, and a test set, and the model is a model to be trained. Herein, each sample in the input data may be a text recorded by one or more log entries. The model training device may train the model based on the input data. In the model training stage, based on at least one constraint (sometimes referred to as loss), parameters (for example, weights and biases) of the model may be adjusted, and the constraint may represent performance index (for example, accuracy) of the model. The training process may adjust the parameters of the model so that at least one constraint moves in a decreasing direction. The trained model may be provided to processing device 135.

It should be understood that the architecture and functions of environment 100 are described for illustrative purposes only, and do not imply any limitation to the scope of the present disclosure. The embodiments of the present disclosure may also be applied to environments having different structures and/or functions. A process according to one or more embodiments of the present disclosure will be described in detail below with reference to FIG. 2 to FIG. 7. For ease of understanding, specific data mentioned in the following description is illustrative and is not intended to limit the protection scope of the present disclosure. It should be understood that the embodiments described below may also include additional actions not shown and/or may omit actions shown, and the scope of the present disclosure is not limited in this regard.

Figure 2:
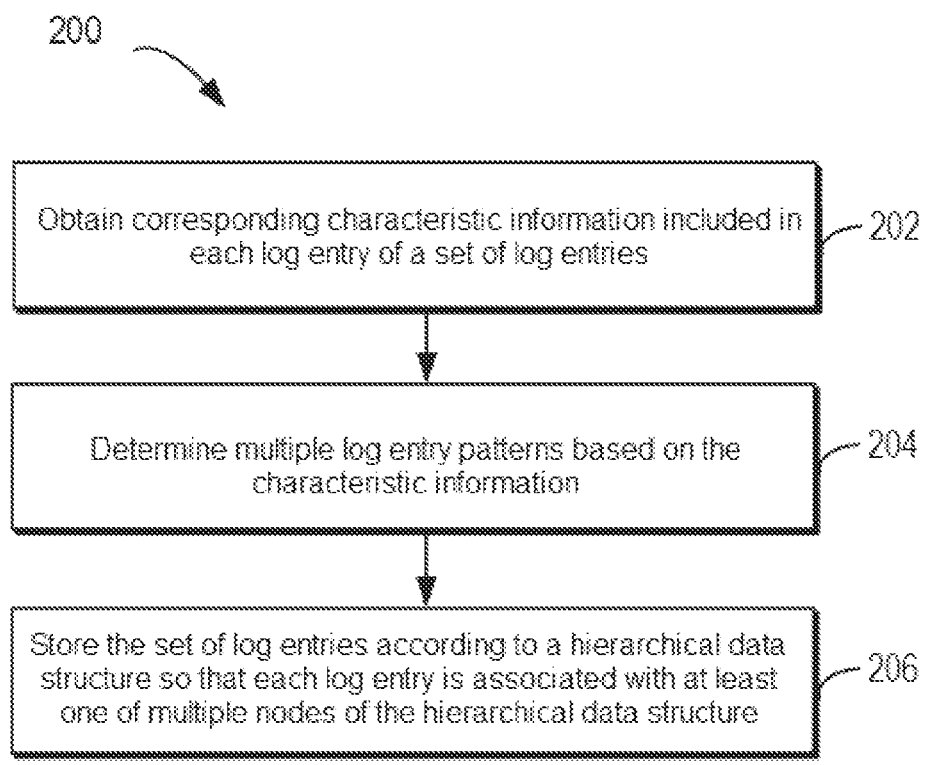
FIG. 2 illustrates a flowchart of a process for obtaining a hierarchical data structure according to one or more embodiments of the present disclosure.

FIG. 2 illustrates a flowchart of process 200 for obtaining a hierarchical data structure according to one or more embodiments of the present disclosure. Process 200 may be implemented, for example, at data structure obtaining device 115 (hereinafter sometimes also referred to as an obtaining device for short) shown in FIG. 1. The hierarchical data structure may be configured to store a set of log entries in a structured manner to facilitate subsequent access, retrieval, and/or analysis of the stored log entries.

As shown in FIG. 2, at 202, obtaining device 115 may obtain corresponding characteristic information included in each log entry of a set of log entries. In some embodiments, obtaining device 115 may first identify a format in which the set of log entries are recorded. A log file generally contains structured information. For example, each log entry may include multiple fields, and each field stores certain type of information. Examples of the fields include, but are not limited to, time information fields, machine information fields, path information fields, custom information fields, and the like. In some embodiments, the time information fields may include at least one of the following: a date field, a time field, a timestamp field, and a year field; the machine information fields may include at least one of the following: a fully qualified domain name (FQDN) field, a domain name field, an IP address field, and an MAC address field; the path information field may include at least one of the following: a URL/URI field, a system (such as Windows) path field; the custom information fields may include at least one of the following: a process ID field, a thread ID field, and a job ID field. Corresponding information may be recorded, for example, in the form of a text, in each field.

Based on the recognized format, obtaining device 115 may determine a predetermined rule for extracting corresponding characteristic information, and extract the corresponding characteristic information based on the predetermined rule. For example, for a log entry stored in a predetermined format, the corresponding information recorded in certain fields may be more valuable for subsequent processing, and can represent characteristics of the information recorded in the log entry. Therefore, the predetermined rule can be set for extracting such characteristic information from the predetermined field of the log entry.

Figure 3:
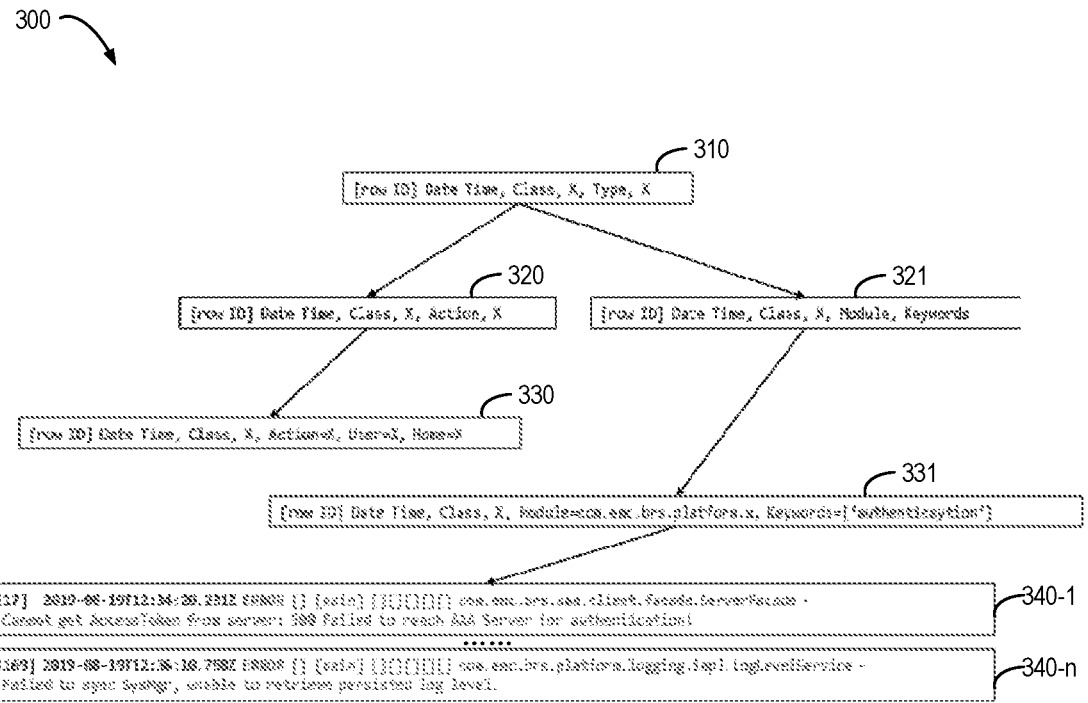
FIG. 3 illustrates a schematic diagram of a hierarchical data structure according to one or more embodiments of the present disclosure.

At 204, obtaining device 115 may determine multiple log entry patterns based on the corresponding characteristic information. Herein, pattern characteristic information of the term "pattern" may refer to general characteristic information corresponding to original information recorded in log entries. Therefore, the log entries with the same or similar characteristic information may be determined as belonging to the same or similar pattern. For ease of understanding, it will be described in detail below in conjunction with FIG. 3. FIG. 3 illustrates a schematic diagram of hierarchical data structure 300 (hereinafter sometimes also referred to as a data structure for short) according to one or more embodiments of the present disclosure. It should be understood that the data structure is simply illustrated in FIG. 3 for illustrative purposes only, and the actual data structure used to implement the embodiments of the present disclosure may include more or fewer levels while each level may include more nodes, which is not limited in the present disclosure.

As illustrated in FIG. 3, a set of log entries may include log entries 340-1 to 340-$n$. Each log entry may record corresponding information in multiple fields. For example, for a subset of log entries including log entries 340-1, 340-$n$, and other similar log entries which are not shown, based on the same or similar parts among corresponding characteristic information extracted from their predetermined fields, one or more corresponding log entry patterns may be determined, which may correspond to one or more nodes in hierarchical data structure 300. This process may be regarded as a process of clustering a set of log entries based on characteristic information. Each log entry pattern may include pattern characteristic information and data structure domain information. The pattern characteristic information may correspond to characteristic information of a subset of log entries in the set of log entries.

In some embodiments, the pattern characteristic information may be characteristic information common to log entries in a subset of log entries. In some embodiments, for a subset of log entries, multiple pieces of common characteristic information (for example, the pattern characteristic information presented in nodes 331, 321, and 310) may be determined based on the characteristic information of the subset of log entries, and therefore the subset of log entries have multiple log entry patterns corresponding thereto. The pattern characteristic information of the log entry patterns corresponding to nodes 331, 321, and 310 may be associated to each other, and may be different levels of abstraction of the original characteristic information of the log entries. For example, the pattern characteristic information of the log entry pattern corresponding to node 321 may be an abstract, or simplified, or highly formatted expression of the pattern characteristic information of the log entry pattern corresponding to node 331. The pattern characteristic information of the log entry pattern corresponding to node 310 may be an abstract, or simplified, or highly formatted expression of the pattern characteristic information of the log entry pattern corresponding to nodes 321 and 320, and further may be an abstract, simplified, or highly formatted expression of the pattern characteristic information of the log entry pattern corresponding to notes 330 and 331.

Referring back to FIG. 2, at 206, obtaining device 115 may store a set of log entries according to a hierarchical data structure, so that each log entry is associated with at least one node of the multiple nodes in the hierarchical data structure. Continuing to describe with reference to FIG. 3, as discussed above, since log entries in a set of log entries may respectively correspond to multiple log entry patterns, they may respectively correspond to respective nodes in the hierarchical data structure. Based on a correlation among pattern characteristic information of log entry patterns, hierarchical data structure 300 may be constructed.

In the hierarchical data structure, each log entry is at least associated with a top node, and the top node (for example, node 310) is located in the top level of the hierarchical data structure. Each log entry is also associated with branch nodes (for example, nodes 321 and 331) which are located at one or more levels lower than the top level of the hierarchical data structure. The branch nodes (for example, nodes 321 and 331) are associated with the top node (for example, node 310). With the hierarchical data structure, the original characteristic information in the log entries at different levels can be extracted, for example, to support subsequent responses to various queries on vague or precise query text.

Hierarchical data structure 300 may also support linking a to-be-stored log entry in a newly received to-be-stored log file to one or some nodes. In some embodiments, in response to receiving a to-be-stored log entry, obtaining device 115 may determine first characteristic information of the to-be-stored log entry. A method for determining the first characteristic information is similar to the new method for obtaining the characteristics of the log entries discussed above, so no more elaboration will be made herein. Based on the first characteristic information, obtaining device 115 may determine at least one target node for storing the to-be-stored log entry. The pattern characteristic information corresponding to the at least one target node matches the first characteristic information. Then, obtaining device 115 may store the to-be-stored log entry as being associated with the at least one target node, so that the hierarchical data structure may be updated based on the received log file to include the log entry included in the log file.

In some embodiments, for each to-be-stored log entry, obtaining device 115 may determine whether there is a node matching the to-be-stored log entry in each layer from the bottom level to the top level of the hierarchical data structure. In some embodiments, based on the first characteristic information, obtaining device 115 may determine branch nodes located in the bottom level of the hierarchical data structure, and pattern characteristic information related to the determined branch nodes may match the first characteristic information. For example, the pattern characteristic information may be the same as the first characteristic information, or may be an abstract, simplified, or highly formatted expression of the latter. Based on the hierarchical data structure, obtaining device 115 may determine a top node that is located in the top level of the hierarchical data structure and is associated with the determined branch nodes. Since the association relationship among the nodes in the hierarchical data structure is known, based on the determined branch nodes in the bottom level, associated nodes (including the branch nodes in the higher levels and the top node) in levels above the bottom level may be determined. If the first characteristic information matches the pattern characteristic information related to the determined top node, obtaining device 115 may determine the branch nodes and the top node as target nodes, so that the to-be-stored log entry is stored as being associated with the target nodes for subsequent processing.

In some cases, if the first characteristic information does not match the pattern characteristic information related to the top node, because the to-be-stored log entry cannot be stored as being associated with the corresponding top node, obtaining device 115 may store the to-be-stored log entry in a cache. In response to the number of the to-be-stored log entries in the cache reaching a predetermined number, obtaining device 115 may perform, based on the first characteristic information corresponding to the predetermined number of to-be-stored log entries, clustering the predetermined number of to-be-stored log entries, to determine additional pattern characteristic information. Based on the additional pattern characteristic information, obtaining device 115 may create an additional top node in the hierarchical data structure. It is to be understood that the additional top node corresponds to an additional log entry pattern determined based on the additional pattern characteristic information. In this case, obtaining device 115 may determine the branch nodes and the top node as target nodes, so that the to-be-stored log entries are stored as being associated with the target nodes for subsequent processing.

In this way, the data structure obtaining device may store, according to the hierarchical data structure, a set of log entries and additionally newly received to-be-stored log entries, and nodes in the hierarchical data structure can correspond to a subset of log entries having common characteristic information. Based on this, subsequent efficient processing of the log entries can be promoted, such as quick access to corresponding target log entries through query requests, and further analysis of the content recorded in the related log entries to determine key information.

Figure 4:
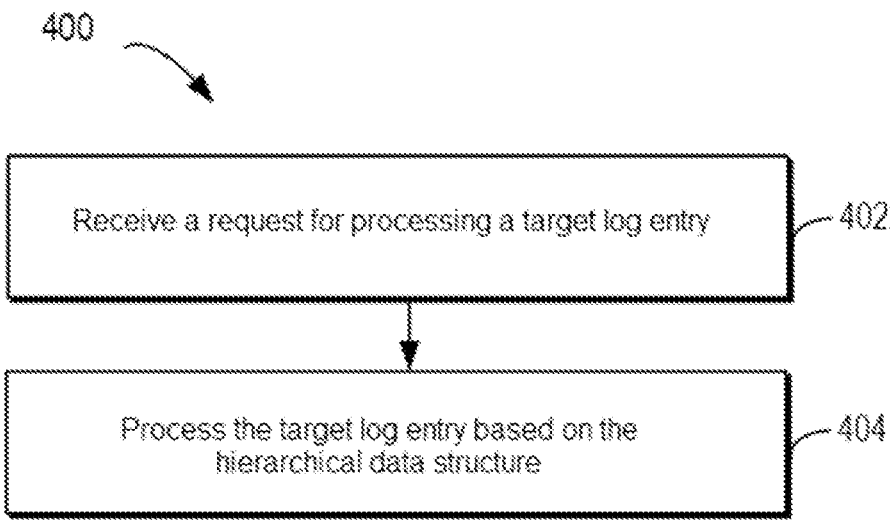
FIG. 4 illustrates a flowchart of a process for processing a log entry according to one or more embodiments of the present disclosure.

FIG. 4 illustrates a flowchart of process 400 for processing a log entry according to one or more embodiments of the present disclosure. Process 400 may be implemented, for example, by processing device 135 shown in FIG. 1. As shown in FIG. 4, at 402, processing device 135 receives a request for processing a target log entry. In some embodiments, the request may include at least one of the following: a query request at least related to a target log entry pattern, a first request for analyzing a first node among multiple nodes, and a second request for analyzing a first pattern and a second pattern related with the first pattern.

At 404, processing device 135 processes the target log entry based on the hierarchical data structure obtained according to the description of FIG. 2, so as to correspond to the received request. In this way, the structured characteristic information may be used to efficiently process or analyze the log entry.

In some embodiments, in the case that the received request includes the query request at least related to the target log entry pattern, processing device 135 is required to search one or more target log entries, corresponding to the query request, in a set of log entries stored in the hierarchical data structure. In some embodiments, processing device 135 may determine at least one target node matching the target log entry pattern, among multiple nodes, and further determine a target log entry associated with the at least one target node, from a set of log entries, so as to respond to the query request.

For ease of understanding, how to respond to the query request will be described in detail below in conjunction with FIG. 3. In some embodiments, for the query request, processing device 135 may determine whether each level has a node having pattern characteristic information that matches the query text included in the query request in a sequence from the bottom level to the top level of hierarchical data structure 300, where the query text may correspond to the pattern characteristic information of the target log entry pattern. Thus, processing device 135 may first determine at least one target top node (for example, top node 310), accordingly determine one or more branch nodes (for example, branch nodes 320 and 321) associated with the at least one target top node and at a lower level, and based on the pattern characteristic information related to the branch nodes and the query text, determine a matching target branch node (for example, branch node 320) in the lower level of the one or more branch nodes. By performing hierarchical matching in this way, a target log entry (for example, log entry 340-1) corresponding to the query request may be located quickly and efficiently. It is understandable that when no node corresponding to the query request exits in the hierarchical data structure, the processing device will respond to the query request with a null value.

Referring back to FIG. 4, the hierarchical data structure can be used to cluster related log entries (for example, all or part of the log entries corresponding to a node) together to form a block of log entries, and can use artificial intelligence technologies such as machine learning to analyze the multiple log entries included in the block of log entries, to determine key information recorded in these log entries, and accordingly determine an in-block pattern for identifying general information related to these log entries overall. The in-block pattern is sometimes also referred to herein as a first pattern or a second pattern.

Figure 5:
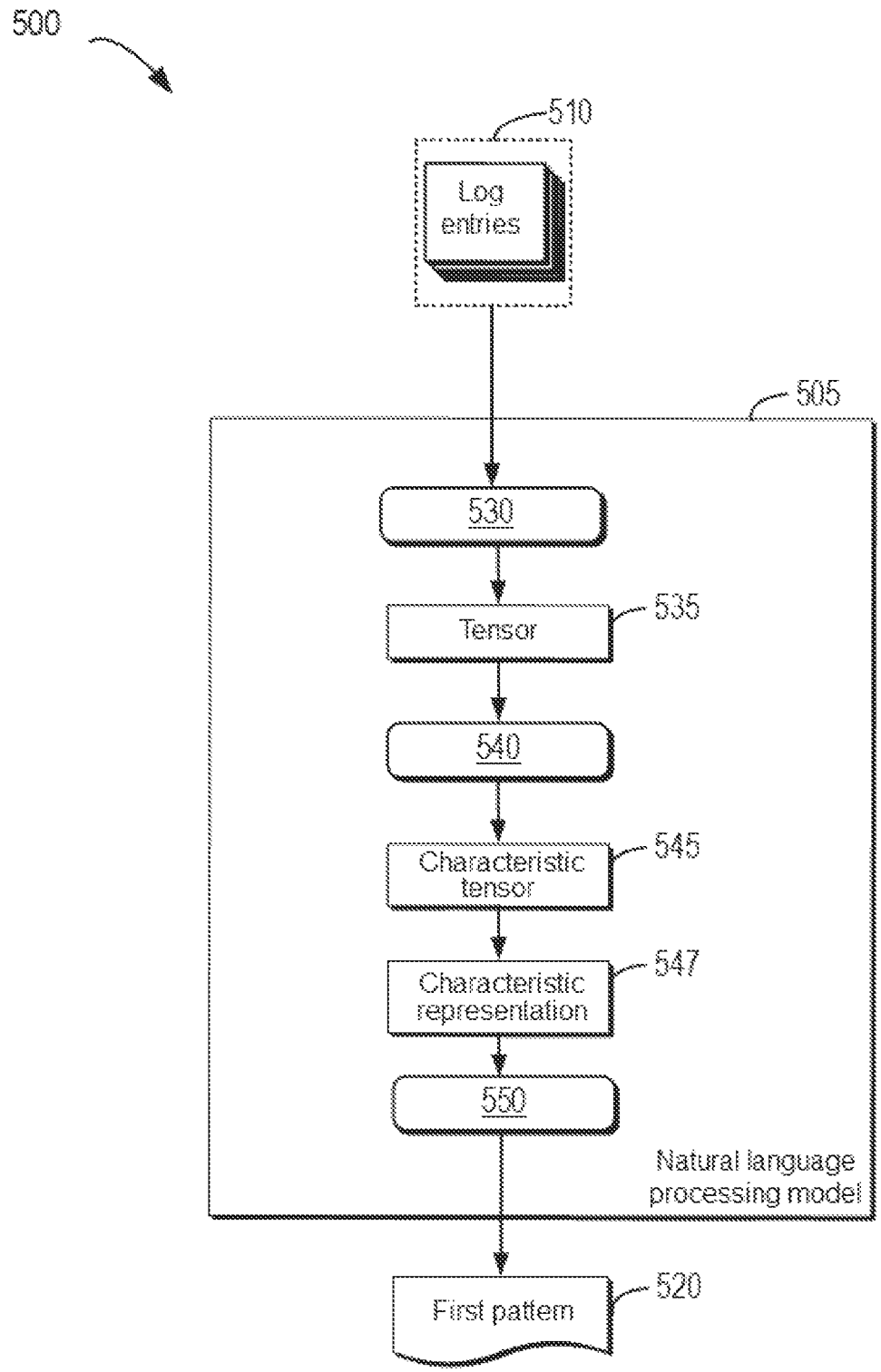
FIG. 5 illustrates a schematic diagram of a process for determining a first pattern based on a natural language processing model according to one or more embodiments of the present disclosure.

In some embodiments, in a case where the received request includes the first request for analyzing the first node among the multiple nodes, processing device 135 is required to analyze the log entries, associated with the first node, in a set of log entries, so as to, for example, remove irrelevant redundant information and determine key information. For ease of understanding, the processing of the first request will be described in detail below in conjunction with FIG. 5. FIG. 5 illustrates a schematic diagram of process 500 for determining a first pattern based on a natural language pattern according to one or more embodiments of the present disclosure. Processing device 135 may determine first subset 510 of target log entries associated with the first node. Each log entry will record a large amount of characteristic information such as time information, machine information, path information, and event information in each field according to a predetermined log record format.

In some embodiments, processing device 135 may determine, based on the determined first subset 510 of target log entries and natural language processing mode 505, the first pattern associated with the first subset 510 of target log entries, to respond to the first request. Pattern characteristic information of the first pattern identifies key information in the content recorded by the first subset of target log entries. In some embodiments, natural language processing model 505 may include multiple modules configured to perform respective functions. Specifically, in some embodiments, processing device 135 combines target log entries in the first subset of target log entries to obtain a first combined log text. A first identifier (for example, [CLS]) may be added at the beginning of the first combined log text, and a second identifier (for example, [SEP]) may be added at the end of the first combined log text, so that the first combined log text can be identified by the model. The above identifiers are only specific examples, and it is understandable that the identifiers may be set correspondingly according to different natural language understanding models.

Model 505 may include word segmentation and tensor generation module 530 that is configured to divide the first combined log text into a sequence composed of a single word, and convert the sequence of the word into a vector (for example, an embedded vector, which may include information identifying characteristics of the words in the text and information about locations of the words in the text). Module 530 is further configured to arrange the converted vector into tensor 535 (for example, a two-dimensional matrix composed of multiple vectors). Tensor 535 may be input to characteristic extraction module 540 of the natural language processing model, such as a BERT-based module. Module 540 may be configured to determine first characteristic representation 547 for the first combined log text. In some embodiments, based on tensor 535 input, module 540 will output characteristic tensor 545 of which the number of dimensions may be {the number of log entries in the first subset of target log entries, the maximum number of the vectors corresponding to one log entry, and the number of hidden layers in module 540}. Characteristic tensor 545 may be further divided into first characteristic representation 547 corresponding to tensor 535. Both tensor 535 and first characteristic representation 547 may be a two-dimensional matrix. In some embodiments, both the tensor and the first characteristic representation have the same number of lines and columns. First characteristic representation 547 may be input into classifier module 550, which is configured to determine the first pattern based on the first characteristic representation, and thus may classify first subset 510 of target log entries as belonging to the first pattern. Examples of classifier module 550 include but are not limited to a classifier based on a logistic regression algorithm, and/or a decision tree algorithm, and/or ensemble learning. In some embodiments, classifier module 550 may be a classifier based on a logistic regression algorithm. The pattern characteristic information of the first pattern may be a root cause for recording of the log entries in the first subset of target log entries, for example, a specific failure or error in a storage system, an application, or a service.

Because the pattern characteristic information of the first pattern identifies the key information in the content recorded by the first subset of target log entries, in this way, multiple associated log entries can be analyzed to remove redundant information recorded therein, so as to obtain the key information expected by a user (for example, an in-block pattern), thereby facilitating performing corresponding operations based on the key information subsequently.

Referring back to FIG. 4, for the associated in-block patterns (for example, the first pattern and the associated second pattern and/or other additional in-block patterns), artificial intelligence techniques such as machine learning can be used to analyze corresponding multiple sets of log entries in multiple associated log entry blocks, and to determine the key information recorded in the multiple sets of log entries, thereby determining a block-linked pattern for identifying general information about the log entries overall. The block-linked pattern is sometimes also referred to as a third pattern herein.

Figures 6, 7A:
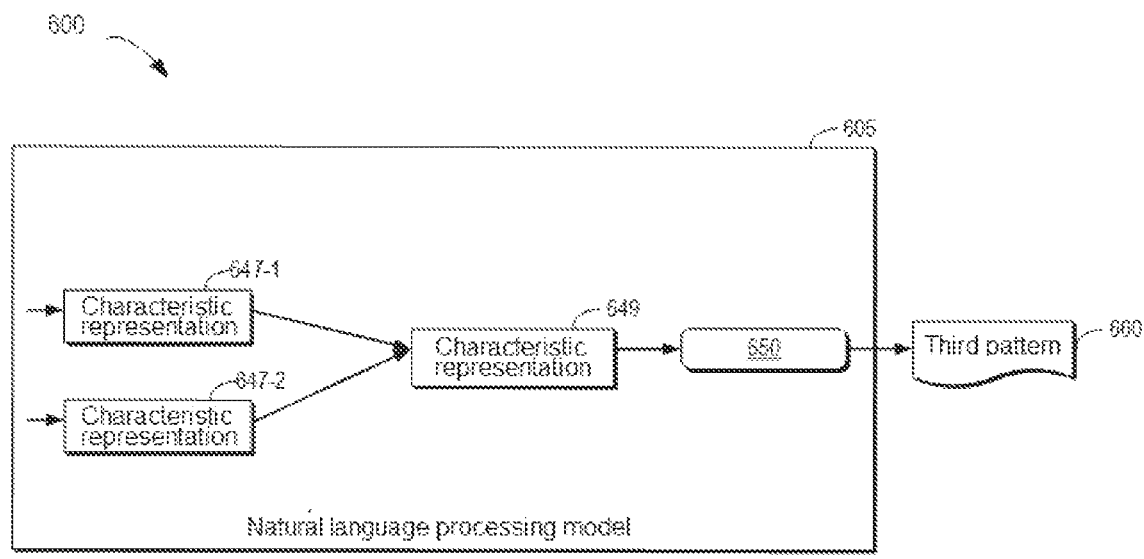

In a case where the received request further includes a second request for analyzing the first pattern and the second pattern associated with the first pattern, processing device 135 is required to analyze multiple subsets of log entries to determine the key information common to the multiple subsets of log entries. For example, when a storage system fails, multiple applications or services using the failed storage system will also have corresponding failures or errors. Therefore, there is a need to find out the root cause of the associated failure. For ease of understanding, the processing of the second request will be described in detail below in conjunction with FIG. 6. FIG. 6 illustrates a schematic diagram of process 600 for determining a third pattern based on natural language processing model 605 according to one or more embodiments of the present disclosure. It is understandable that model 605 is similar in structure and function to model 505 described with reference to FIG. 5, and therefore, the description of some of modules and corresponding operations performed by them is omitted.

In some embodiments, processing device 135 may determine multiple patterns having an association relationship, for example, a first pattern and a second pattern. For example, based on the process described above with reference to FIG. 5, through the characteristic extraction module of natural language processing model 605, processing device 135 may determine first characteristic representation 647-1 corresponding to the first subset of target log entries, and second characteristic representation 647-2 corresponding to the second subset of target log entries. Specifically, processing device 135 combines the first and second subsets of target log entries associated with the first and second patterns to obtain a first combined log text and a second combined log text. Based on the first and second combined log texts, processing device 135 may determine, based on the similar process described above with reference to FIG. 5, the first and second characteristic representations for the first and second combined log texts. In some embodiments, after the processing device analyzes each subset of log entries in process 500 described with reference to FIG. 5, processing device 135 may store the obtained characteristic representations in the storage device for direct use in process 600.

The processing device may then determine, based on first characteristic representation 647-1 and second characteristic representation 647-2, third pattern 650 to respond to the second request. In some embodiments, first characteristic representation 647-1 and second characteristic representation 647-2 may be spliced together in sequence to form combined characteristic representation 649 in the form of a sequence. In some embodiments, first characteristic representation 647-1 and second characteristic representation 647-2 may form combined characteristic representation 649 having a higher number of dimensions. Other techniques that can combine multiple characteristic representations are also applicable. Similarly, combined characteristic representation 649 may be input into classifier module 650, and module 550 may be configured to determine a third pattern based on combined characteristic representation 649, and thus may determine the third pattern related to both the first pattern and the second pattern. Similar to classifier module 550 described with reference to FIG. 5, examples of classifier module 650 also include, but are not limited to, a classifier based on a logistic regression algorithm, and/or a decision tree algorithm, and/or ensemble learning. The difference of the two modules lies in the number of dimensions or form of input data that they can process. In some embodiments, classifier module 650 may be a combined ensemble learning classifier.

The pattern characteristic information of the third pattern identifies the key information in the content recorded by both the first subset of target log entries and the second subset of target log entries. The pattern characteristic information of the third pattern may be a root cause for recording of the log entries in the first and second subsets of target log entries (additionally, associated other target log entries) associated with the first pattern (for example, related to a failure of a first application or service) and the second pattern (for example, related to a failure of a second application or service that is different from the first application or service), for example, a specific failure or error of the storage system.

Although in these examples, two characteristic representations 647-1 and 647-2 being used to determine the third pattern is used for description, it will be understood that the present disclosure does not limit the number of characteristic representations, and three or more characteristic representations may also be used to form a combined characteristic representation for determining the third pattern.

Since the pattern characteristic information of the third pattern identifies the key information in the content recorded by two or more patterns, in this way, multiple associated patterns can be analyzed to obtain the key information capable of representation among multiple patterns, and accordingly to determine the third pattern (that is, a log block-linked pattern), thereby facilitating subsequent execution of corresponding operations based on the key information.

FIG. 7A to FIG. 7C illustrate tables of rules for rating log processing according to one or more embodiments of the present disclosure. FIG. 7A shows table 710 of rules for rating a maturity of log files or log entries (sometimes collectively referred to as logs in these embodiments) according to one or more embodiments of the present disclosure. The maturity may be scored based on the rules of four dimensions. The four dimensions include, as shown in table 710, for example, analyzability (for example, analyzability of texts and/or formats recorded in the logs, and ability to locate causes of defects or failures), maintainability (for example, repairability for defects or failures or improvement of existing functions), security, and supportability (for example, compatibility and extensibility) of the logs. The log maturity may indicate a degree of standardization of the logs, and the standardized logs are a basis of a subsequent log analysis process.

It is understandable that although only the way of scoring by the rules from four dimensions for maturity rating is shown, the rules from more or fewer dimensions may also be set as needed. Although it is shown that each dimension may be divided into three levels according to two score thresholds, more score thresholds may be set as needed to divide the dimension into more levels, or different score thresholds may be set. The present disclosure is not limited to this.

FIG. 7B illustrates table 720 of rules for rating a confidence in a log analysis process according to one or more embodiments of the present disclosure. The confidence may be scored based on the rules of five dimensions. The confidence may indicate a degree of accuracy of the analysis process. For each dimension, one or more rules can be set to score. The five dimensions include a speed dimension shown in table 720, and the scoring rule of the speed dimension includes, but is not limited to, a response speed to a processing request during the log analysis process.

The five dimensions further include a source dimension shown in table 720. The scoring rule of the source dimension includes, but is not limited to, supportability to analysis of the logs from a distributed system (such as Kubernetes), and/or supportability to analysis of application or service logs (such as a container service).

The five dimensions further include a search dimension as shown in table 720. The scoring rule of the search dimension includes, but is not limited to, supportability to a basic query syntax, and/or supportability to a complex query syntax (for example, a combined syntax), and/or supportability to a time-based filter.

The five dimensions further include a scalability dimension as shown in table 720. The scoring rule of the scalability dimension includes, but is not limited to, supportability to incremental log analysis, and/or supportability to log burst (i.e., a large amount of logs increased within a predetermined time), and/or supportability to cloud-scale logs, and/or supportability to terabytes of log data.

The five dimensions further include an advanced analysis dimension as shown in table 720. The scoring rule of the advanced analysis dimension includes, but is not limited to, supportability to contemporary logging, and/or supportability to monitoring of potential log sources, and/or supportability to alarming and reviewing of potential problems, and/or supportability to analysis of root causes of failures, and/or supportability to a streamlined report and a dashboard report.

It is understandable that although only the way of scoring by the rules from five dimensions for maturity rating is shown, the rules from more or fewer dimensions may also be set as needed. Although it is shown that each dimension may be divided into three levels based on two score thresholds, more score thresholds may be set as needed to divide the dimension into more levels, or different score thresholds may be set. The present disclosure in each dimension is not limited to this.

FIG. 7C illustrates table 730 of rules for comprehensive rating of log analysis results according to one or more embodiments of the present disclosure. Because both the confidence in the log analysis process and the maturity of the logs may affect the degree of accuracy of a final analysis result, the comprehensive rating can be obtained from these two dimensions so as to determine the confidence of the final analysis result.

For example, if the log maturity level and the confidence level are both level three, then the degree of accuracy of the final analysis result may be determined to be level three; if the log maturity level is level three but the confidence level is level two, the degree of accuracy of the final analysis result may be determined to be level two (that is, the lower level between the two).

Based on the tables in FIG. 7A to FIG. 7C, computing device 105 can determine at least one of the above two levels. In some embodiments, corresponding monitoring parameter thresholds may be set for the score thresholds of the various rules shown in the above tables, and computing device 105 may, for example, obtain parameters associated with the log files and log entries in a real-time monitoring manner, compare the parameters with the corresponding monitoring parameter thresholds to obtain corresponding scores, thereby determining the corresponding levels based on the obtained scores.

In some embodiments, the computing device may determine, based on a set of log entries, at least one first performance measure used to represent the set of log entries. The at least one first performance measure indicates at least one of the following: analyzability, maintainability, security, and supportability. The computing device may also determine, based on the collected parameters associated with the processing during the log processing, at least one second performance measure used to represent the confidence in the log processing. The second performance measure indicates at least one of the following of the log processing: speed, queryability, scalability, supportability to different log sources, and analyticity that can be advanced. Based on the at least one first performance measure and the at least one second performance measure, the computing device may perform adjustments on the set of log entries and at least one items of the processing, so that the at least one item is optimized. The adjustments include, but are not limited to: modifying the format in which the set log entries are recorded; modifying the content recorded by each (type) of log entries in the set of log entries; adjusting one or more nodes of the hierarchical data structure, and the associated log entries thereof; and adjusting the parameters used in the above-mentioned various processing and analysis processes.

Figure 8:
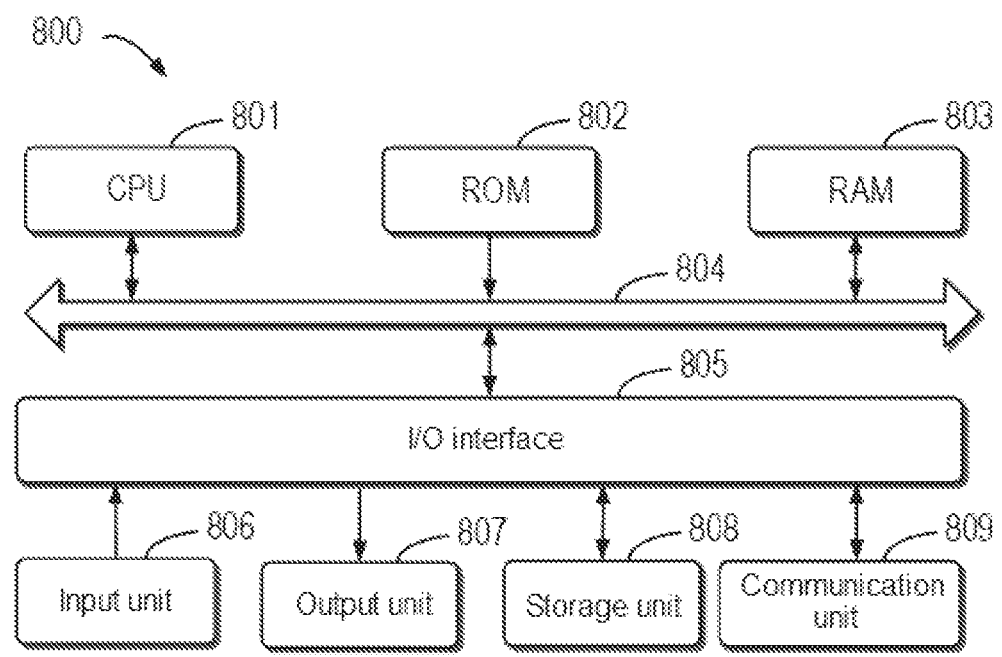
FIG. 8 illustrates a block diagram of an example device that may be configured to implement one or more embodiments of the present disclosure.

FIG. 8 shows a schematic block diagram of example electronic device 800 that may be configured to implement one or more embodiments of the present disclosure. For example, electronic device 800 may be configured to implement computing device 105 as shown in FIG. 1. As shown in the figure, electronic device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. In RAM 803, various programs and data required for the operation of device 800 may also be stored. CPU 801, ROM 802, and RAM 803 are connected to each other through bus 804. Input/output (I/O) interface 805 is also connected to bus 804.

Multiple components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

Processing unit 801 performs the various methods and processing described above, such as processes 200, 400, 500, and 600. For example, in some embodiments, the various methods and processing described above may be implemented as computer software programs or computer program products, which are tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps of any process described above may be implemented. Alternatively, in other embodiments, CPU 801 may be configured in any other suitable manners (for example, by means of firmware) to perform a process such as processes 200, 400, 500, and 600.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, any non-transient storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, including an object oriented programming language, such as Smalltalk, C ++, and the like, and a conventional procedural programming language, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various implementations of the present disclosure have been described above. The foregoing description is exemplary rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for processing a log entry, comprising:
receiving a request for processing a target log entry;
obtaining a hierarchical data structure by:
  obtaining corresponding characteristic information comprised in each log entry of a set of log entries;
  determining multiple log entry patterns based on the corresponding characteristic information, wherein pattern characteristic information of each log entry pattern corresponds to the characteristic information of a subset of log entries in the set of log entries; and
  storing the set of log entries according to the hierarchical data structure so that each log entry is associated with at least one of multiple nodes of the hierarchical data structure, wherein the multiple nodes respectively correspond to the multiple log entry patterns, and are hierarchically organized based on respective corresponding log entry patterns, and wherein the request comprises a first request for analyzing a first node of the multiple nodes; and
processing the target log entry based on the hierarchical data structure, wherein processing comprises:
  determining a first subset of target log entries associated with the first node;
  determining, based on the first subset of target log entries and using a natural language processing model, a first pattern associated with the first subset of target log entries for responding to the first request by:
    combining target log entries in the first subset of target log entries to obtain a first combined log text;
    determining a first characteristic representation for the first combined log text with the natural language processing model; and
    determining the first pattern by using the first characteristic representation as an input to a classifier module;
  wherein the first pattern comprises key information in the first subset of target log entries, and wherein the natural language processing model comprises a pretrained neural network; and
  removing, based on the first pattern, redundant information recorded in the first subset of target log entries.

2. The method according to claim 1, wherein in the hierarchical data structure, each log entry is at least associated with a top node, and the top node is located at a top level of the hierarchical data structure.

3. The method according to claim 2, wherein each log entry is further associated with a branch node, the branch node is located at a level lower than the top level of the hierarchical data structure, and the branch node is associated with the top node.

4. The method according to claim 1, further comprising:
in response to receiving a to-be-stored log entry, determining first characteristic information of the to-be-stored log entry;
determining at least one target node based on the first characteristic information, wherein the pattern characteristic information corresponding to the at least one target node matches the first characteristic information; and
storing the to-be-stored log entry as being associated with the at least one target node.

5. The method according to claim 4, wherein determining the at least one target node comprises:
determining a branch node located at a bottom level of the hierarchical data structure based on the first characteristic information, wherein the pattern characteristic information related to the determined branch node matches the first characteristic information;
determining, based on the hierarchical data structure, a top node located at a top level of the hierarchical data structure and associated with the determined branch node; and
if the first characteristic information matches the pattern characteristic information related to the top node, determining the branch node and the top node as target nodes.

6. The method according to claim 5, further comprising:
if the first characteristic information does not match the pattern characteristic information related to the top node, storing the to-be-stored log entry in a cache;
in response to the to-be-stored log entries in the cache reaching a predetermined number, clustering the predetermined number of the to-be-stored log entries to determine additional pattern characteristic information; and
creating an additional top node in the hierarchical data structure based on the additional pattern characteristic information, wherein the additional top node corresponds to an additional log entry pattern determined based on the additional pattern characteristic information; and
determining the branch node and the additional top node as target nodes.

7. The method according to claim 1, wherein obtaining the characteristic information comprises:
identifying a format in which the set of log entries are recorded;
determining, based on the identified format, a predetermined rule for extracting the corresponding characteristic information; and
extracting the corresponding characteristic information based on the predetermined rule.

8. The method according to claim 1, wherein the request comprises a query request at least related to a target log entry pattern, and processing the target log entry comprises:
determining, in the multiple nodes, at least one target node which matches the target log entry pattern; and
determining, from the set of log entries, a target log entry associated with the at least one target node, for responding to the query request.

9. The method according to claim 1, wherein the request further comprises a second request for analyzing the first pattern and a second pattern associated with the first pattern, and processing the target log entry further comprises:
combining a second subset of target log entries associated with the second pattern to obtain a second combined log text;
determining a second characteristic representation for the second combined log text with the natural language processing model; and
determining a third pattern based on the first characteristic representation and the second characteristic representation, for responding to the second request, wherein pattern characteristic information of the third pattern identifies key information in content recorded by both the first subset of target log entries and the second subset of target log entries.

10. An electronic device, comprising:
a processor; and
a memory coupled to the processor and having instructions stored therein, wherein the instructions, when executed by the processor, cause the electronic device to execute actions, and the actions comprise:
receiving a request for processing a target log entry;
obtaining a hierarchical data structure at the electronic device, wherein obtaining comprises:
obtaining corresponding characteristic information comprised in each log entry of a set of log entries;
determining multiple log entry patterns based on the corresponding characteristic information, wherein pattern characteristic information of each log entry pattern corresponds to the characteristic information of a subset of log entries in the set of log entries; and
storing the set of log entries according to the hierarchical data structure so that each log entry is associated with at least one of multiple nodes of the hierarchical data structure, wherein the multiple nodes respectively correspond to the multiple log entry patterns, and are hierarchically organized based on respective corresponding log entry patterns, and wherein the request comprises a first request for analyzing a first node of the multiple nodes; and
processing the target log entry based on the hierarchical data structure, wherein processing comprises:
determining a first subset of target log entries associated with the first node;
determining, based on the first subset of target log entries and using a natural language processing model, a first pattern associated with the first subset of target log entries for responding to the first request by:
determining a first characteristic representation of the first subset of target log entries; and
determining the first pattern by using the first characteristic representation as an input to a classifier module;
wherein the first pattern comprises key information in the first subset of target log entries, and wherein the natural language processing model comprises a pre-trained neural network; and
removing, based on the first pattern, redundant information recorded in the first subset of target log entries.

11. The electronic device according to claim 10, wherein the actions further comprise:
in response to receiving a to-be-stored log entry, determining first characteristic information of the to-be-stored log entry;
determining at least one target node based on the first characteristic information, wherein the pattern characteristic information corresponding to the at least one target node matches the first characteristic information; and
storing the to-be-stored log entry as being associated with the at least one target node.

12. The electronic device according to claim 11, wherein determining the at least one target node comprises:
determining a branch node located at a bottom level of the hierarchical data structure based on the first characteristic information, wherein the pattern characteristic information related to the determined branch node matches the first characteristic information;
determining, based on the hierarchical data structure, a top node located at a top level of the hierarchical data structure and associated with the determined branch node; and
if the first characteristic information matches the pattern characteristic information related to the top node, determining the branch node and the top node as target nodes.

13. The electronic device according to claim 12, wherein the actions further comprise:
if the first characteristic information does not match the pattern characteristic information related to the top node, storing the to-be-stored log entry in a cache;
in response to the to-be-stored log entries in the cache reaching a predetermined number, clustering the predetermined number of the to-be-stored log entries to determine additional pattern characteristic information; and
creating an additional top node in the hierarchical data structure based on the additional pattern characteristic information, wherein the additional top node corresponds to an additional log entry pattern determined based on the additional pattern characteristic information; and
determining the branch node and the additional top node as target nodes.

14. The electronic device according to claim 10, wherein the request comprises a query request at least related to a target log entry pattern, and processing the target log entry comprises:
determining, in the multiple nodes, at least one target node which matches the target log entry pattern; and
determining, from the set of log entries, a target log entry associated with the at least one target node, for responding to the query request.

15. The electronic device according to claim 10, wherein the request further comprises a second request for analyzing the first pattern and a second pattern associated with the first pattern, and processing the target log entry further comprises:
combining a second subset of target log entries associated with the second pattern to obtain a second combined log text;
determining a second characteristic representation for the second combined log text with the natural language processing model; and
determining a third pattern based on the first characteristic representation and the second characteristic representation, for responding to the second request, wherein pattern characteristic information of the third pattern identifies key information in content recorded by both the first subset of target log entries and the second subset of target log entries.

16. A non-transitory computer readable medium comprising computer readable program code, which when executed by a computer processor, enables the computer processor to:
receive a request for processing a target log entry; and
obtain a hierarchical data structure by:
obtaining corresponding characteristic information comprised in each log entry of a set of log entries;
determining multiple log entry patterns based on the corresponding characteristic information, wherein pattern characteristic information of each log entry pattern corresponds to the characteristic information of a subset of log entries in the set of log entries; and
storing the set of log entries according to the hierarchical data structure so that each log entry is associated with at least one of multiple nodes of the hierarchical data structure, wherein the multiple nodes respectively correspond to the multiple log entry patterns, and are hierarchically organized based on respective corresponding log entry patterns, and wherein the request comprises a first request for analyzing a first node of the multiple nodes; and processing the target log entry based on the hierarchical data structure, wherein processing comprises:

determining a first subset of target log entries associated with the first node;

determining, based on the first subset of target log entries and using a natural language processing model, a first pattern associated with the first subset of target log entries for responding to the first request by:

combining target log entries in the first subset of target log entries to obtain a first combined log text;

determining a first characteristic representation for the first combined log text with the natural language processing model; and determining the first pattern by using the first characteristic representation as an input to a classifier module;

wherein the first pattern comprises key information in the first subset of target log entries, and wherein the natural language processing model comprises a pretrained neural network; and removing, based on the first pattern, redundant information recorded in the first subset of target log entries.

* * * * *